United States Patent [19]

Walz et al.

[11] Patent Number: 4,808,658
[45] Date of Patent: Feb. 28, 1989

[54] AMINOURETHANES, PREPARATION AND USE THEREOF

[75] Inventors: Gerd Walz, Wiesbaden; Michael Hönel, Mainz; Gerhard Brincöpke, Frankfurt am Main; Walter Sprenger, Dieburg; Manfred Finke, Kelkheim; Rüdiger Lenz, Frankfurt am Main, all of Fed. Rep. of Germany

[73] Assignee: Hoechst AG, Fed. Rep. of Germany

[21] Appl. No.: 174,726

[22] Filed: Mar. 29, 1988

Related U.S. Application Data

[63] Continuation of Ser. No. 13,404, Feb. 11, 1987, abandoned.

[30] Foreign Application Priority Data

Feb. 13, 1986 [DE] Fed. Rep. of Germany ....... 3604434
Jul. 19, 1986 [DE] Fed. Rep. of Germany ....... 3624454

[51] Int. Cl.$^4$ .............................................. C08G 18/38
[52] U.S. Cl. .................................... 524/591; 524/874; 528/45; 528/49; 528/73
[58] Field of Search .................. 524/591, 874; 528/45, 528/73, 49

[56] References Cited

U.S. PATENT DOCUMENTS

| | | | |
|---|---|---|---|
| 2,802,022 | 8/1957 | Groszos et al. | 260/471 |
| 3,084,140 | 4/1963 | Gurgiolo et al. | 260/77.5 |
| 4,542,173 | 9/1985 | Schupp et al. | 523/414 |
| 4,543,376 | 9/1985 | Schupp et al. | 523/414 |

FOREIGN PATENT DOCUMENTS

| | | |
|---|---|---|
| 84301186 | 2/1984 | European Pat. Off. . |
| 3246812 | 6/1984 | Fed. Rep. of Germany . |
| 3311517 | 10/1984 | Fed. Rep. of Germany . |
| 3311518 | 10/1984 | Fed. Rep. of Germany . |
| 202317 | 6/1981 | Japan . |
| 202318 | 6/1981 | Japan . |
| 413824 | 12/1969 | U.S.S.R. . |

OTHER PUBLICATIONS

Int. Polymer Science & Technology, vol. 8, (1981) Nr. 5.

Primary Examiner—Maurice J. Welsh
Attorney, Agent, or Firm—Bierman & Muserlian

[57] ABSTRACT

The invention relates to aminourethanes essentially composed of structural units derived from (α) polyamines of the general formula (I)

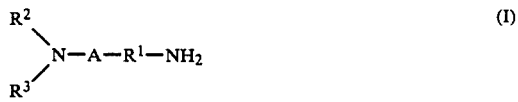

and of structural units derived from (β) oligomeric or polymeric compounds which contain at least one terminal 2-oxo-1,3-dioxolane group.

The invention further relates to a process for preparing these aminourethanes and to their use in particular in paint formulations.

The aminourethanes according to the invention are suitable in particular for use as curable water-dispersible binders in particular for cationic electrocoating.

22 Claims, No Drawings

AMINOURETHANES, PREPARATION AND USE THEREOF

This is a continuation, of Ser. No. 013,404 filed Feb. 11, 1987, now abandoned.

DESCRIPTION

The invention relates to curable, water-dispersible binders which are based on reaction products of modified 2-oxo-1,3-dioxolanes and primary amines which contain at least one primary amino group and additionally further basic groupings and which can be deposited in particular from an aqueous phase in the course of cationic electrocoating.

German Patent No. 2,252,536 describes self-crosslinking binders for cathodic electrocoating which have been obtained from a polyurethane resin which is prepared by reacting epoxide-amine adducts, prepared from an epoxy-containing organic compound with a secondary amine, and a partially blocked polyisocyanate. The blocking agents used are preferably primary aliphatic alcohols. However, the binders must in general be cured at relatively high baking temperatures, for example 180° C. In addition, after baking, the paint coat always contains at least one tertiary amino group per molecule which can have an adverse effect on the film properties. For that reason, products of this type cannot in general be used in all desired paint formulations.

Cathodic electrocoating paints are also described in German Offenlegungsschriften Nos. 3,311,517 and 3,311,518, where polyamies having at least two primary amino groups are made to react with epoxy resins to give epoxide-amine adducts and the reaction products obtained are made to react with alkylene carbonate to form β-hydroxyurethanes. The β-hydroxyurethanes obtained, it is true, generally require lower curing temperatures than the binders described above, but the introduction of the primary amino groups is complicated and necessitates additional process steps.

European Offenlegungsschrift No. 0,119,769 cites various ways of introducing tertiary amino groups into the basic structure of a resin. In addition to the reaction of epoxy compounds with amine components by various methods, the reactions described also include those of resins which contain α,β-unsaturated carboxyl groups or carboxyl-containing resins with amino components. The compounds obtained are then reacted with alkylene carbonates to give binders containing β-hydroxyurethane groups.

In the course of curing, urethane or urea bonds are formed with the elimination of diols which, however, are physiologically not safe. A disadvantage of the reaction of epoxy compounds with ketimines is the need to maintain anhydrous conditions during the reaction in order to avoid premature hydrolysis.

The compounds of the present invention are obtained in a fundamentally different way. This comprises reacting primary amino-containing compounds and compounds which contain further basic groups with carbonates, so that there are always basic amino groups in the resulting products. The curing of coatings which contain the compounds according to the invention as binder can be brought about by forming urethane or urea bonds. The compounds according to the invention can be self-curing by incorporation of blocked isocyanate groups or can be cured by means of added known curing agents via the functional groups present in the binders.

The invention provides aminourethanes essentially composed of structural units derived from (α) polyamines of the general formula (I)

in which
R¹ denotes a divalent hydrocarbon radical, preferably a straight-chain or branched alkylene radical of 2 to 18, preferably 2 to 4, carbon atoms, R² denotes hydrogen, alkyl of 1 to 8 carbon atoms, preferably 1 to 4, carbon atoms or hydroxyalkyl of 1 to 8 carbon atoms, preferably 1 or 2 carbon atoms in the alkyl radical, R³ is equal to R², as long as R² and R³ can also produce a cyclic ring compound, preferably 5-, 6- or 7-membered aliphatic ring, or, when R² is hydrogen, R³ can also be at least one of the radicals (a) to (d):

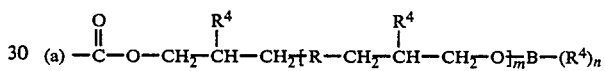

in which R can be identical or diferent and stands for the radical of a diglycidyl ether or ester which may also contain (NR²)—groups, where R² has the above meaning, or for a divalent hydrocarbon radical, preferably an optionally substituted, branched or unbranched alkylene radical of 2 to 18 carbon atoms, preferably 2 to 10 carbon atoms. R⁴ represents hydroxyl or the radical

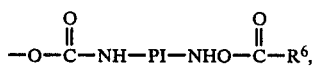

in which PI is the radical of a polyisocyanate and R⁶ the radical of an aliphatic, cycloaliphatic or alkylaromatic monohydric alcohol, of an aminoalcohol, of a ketoxime, of a CH- or NH-acidic compound, B denotes the radical of a polyol, m is a whole number from 1 to 3, preferably 1, and n is a whole number from 1 to 6, preferably 1 to 3, or

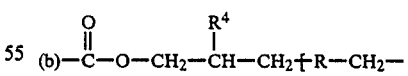

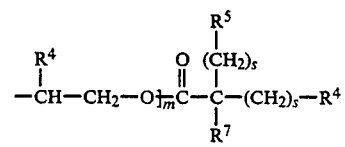

in which R, R⁴ and m have the abovementioned meaning, R⁵ is hydrogen or R⁴, R⁷ denotes an alkyl radical of 1 to 8, preferably 1 to 6, carbon atoms, but in particular CH₃—, and s is a whole number from 1 to 6, preferably 1 or 2, $$-\overset{O}{\underset{\|}{C}}-NH-PI-NH-\overset{O}{\underset{\|}{C}}-O-B(R^4)_n \text{ or} \qquad (c)$$

(d) the groups $R^8$—CHOH—CH$_2$—O—CO— or $R^8$—CHOH—CH$_2$—, in each of which $R^8$ is hydrogen, alkyl of 1 to 18, preferably 1 to 10, carbon atoms or the radicals of glycidyl esters or ethers, preferably glycidyl esters of Versatic acid, or represents the group $$PI^1-\underset{H}{N}-CO,$$

in which PI$^1$ is the radical of a partially blocked-polyisocyanate, and

A is a chemical bond or —($R^1$—NH)$_r$—$R^1$—NH—, in which r is zero or a whole number from 1 to 6, preferably from 1 to 3, and $R^1$ has the above meaning, and of structural unit which are derived from (β) oligomeric or polymeric compounds which contain at least one, preferably two to five, terminal 2-oxo-1,3-dioxolane groups (=cyclic carbonate groups).

The amount of (α) in the aminourethanes according to the invention is in general 35 to 85 mol-%, preferably 50 to 60 mol-%, and that of (β) 65 to 15 mol-%, preferably 40 to 60 mol-%.

Examples of polyols of the radical B are preferably diols and triols such as ethylene glycol, propylene glycol, polycaprolactonepolyol, trimethylolpropane, glycerol, neopentylglycol and pentaerythritol.

Preferably the aminourethanes according to the invention have the general formula (II)

$$R^3 \underset{}{\overset{}{\underset{}{\left[\underset{N}{\overset{R^{2'}}{|}}-A-R^1-\underset{N}{\overset{H}{|}}-\overset{O}{\underset{\|}{C}}-O-CH_2-\underset{CH}{\overset{R^4}{|}}-CH_2-R-CH_2-\underset{CH}{\overset{R^4}{|}}-CH_2-O-\overset{O}{\underset{\|}{C}}\right]_y}}} \underset{N}{\overset{H}{|}}-R^1-A-\underset{R^3}{\overset{R^2}{N}} \qquad (II)$$

in which $R^1$ to $R^4$ and A have the above meaning, $R^{2'}$ is equal to $R^2$, with the proviso that $R^{2'}$ only represents hydrogen if the nitrogen atom in question is not at the end of the chain, y denotes a whole number from 1 to 10, preferably 1 to 5, and R can be identical or different and stands for the radical of a diglycidyl ether or ester which may also contain (NR$^2$)— groups, where $R^2$ has the above meaning, or for a divalent hydrocarbon radical, preferably an optionally substituted, branched or unbranched alkylene radical of 2 to 18 carbon atoms, preferably 2 to 10 carbon atoms.

y in the preceding formula (II) is in particular equal to 1, i.e. the particularly prefrred aminourethanes have according to the invention the general formula (IIa)

$$\underset{R^3}{\overset{R^2}{N}}-A-R^1-\underset{N}{\overset{H}{|}}-\overset{O}{\underset{\|}{C}}-O-CH_2-\underset{CH}{\overset{R^4}{|}}-CH_2-R-CH_2-\underset{CH}{\overset{R^4}{|}}-CH_2-O-\overset{O}{\underset{\|}{C}}-\underset{N}{\overset{H}{|}}-R^1-A-\underset{R^3}{\overset{R^2}{N}} \qquad (IIa)$$

in which $R^1$ to $R^4$ and A have the above meaning.

As regards the radical R in these formulae (II) and (IIa), this radical can have in one embodiment of the invention the following formula $$\left\{O-\underset{}{\overset{}{\bigcirc}}-\underset{X}{\overset{X}{\underset{|}{\overset{|}{C}}}}-\underset{}{\overset{}{\bigcirc}}-O\left(CH_2-CHOH-CH_2-O-\underset{}{\overset{}{\bigcirc}}-\underset{X}{\overset{X}{\underset{|}{\overset{|}{C}}}}-\underset{}{\overset{}{\bigcirc}}-O\right)_u\right\}_v$$

in which X is hydrogen or methyl, u is 0 to 5 and v is 1 to 20, preferably 1 to 6. The values for u and v must be regarded as statistical averages, since the molecular weight distribution of the glycidyl ethers can include a wide range.

A further embodiment relates to those aminourethanes where R in the formulae (I) and (IIa) represents the radical $$\left\{O-\underset{}{\overset{}{\bigcirc}}-\underset{X}{\overset{X}{\underset{|}{\overset{|}{C}}}}-\underset{}{\overset{}{\bigcirc}}-O-CH_2-CHOH-CH_2\right\}_u-R^9-\left[CH_2-CHOH-CH_2-O-\underset{}{\overset{}{\bigcirc}}-\underset{X}{\overset{X}{\underset{|}{\overset{|}{C}}}}-\underset{}{\overset{}{\bigcirc}}-O\right]_u$$

in which X and u have the abovementioned meaning and $R^9$ is O-alkyl-O, N-alkyl-N of in each case 2 to 18 carbon atoms in the alkyl radical and also the radical of polyamines, polyols, polycaprolactonepolyols, OH-containing polyesters, polyethers, hydroxyl-, carboxyl- and aminofunctional polymer oils, polycarboxylic acids, hydroxyl- or amino-functional polytetrahydrofurans and reaction products of polyamines with glycidyl esters of α-branched carboxylic acids of 8 to 14 carbon atoms (so-called (R)Versatic acids).

Preferably $R^9$ represents a radical of one of the following formulae:

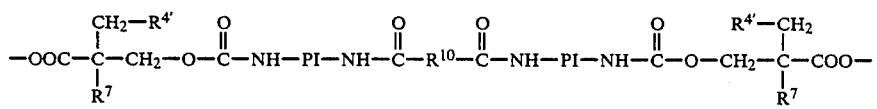

where the radicals $R^7$ and PI have the above meaning, $R^{4'}$ can be not only $R^4$ but also hydrogen, $R^{10}$ stands for the radicals listed under $R^9$, with the exception of the polycarboxylic acids and carboxyl-functional polymer oils, or denotes the radical

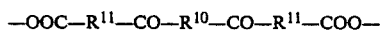

in which $R^{10}$ is defined as above and $R^{11}$ represents the aliphatic, cycloaliphatic or aromatic radical of a polycarboxylic acid. Examples thereof are o- and -phthalic acid, tetrahydrophthalic acid, succinic acid and trimellitic acid, the latter having been preferably reacted with a primary diamine as radical $R^{10}$ with imide formation.

In another embodiment, R in he formula (I) has the structure

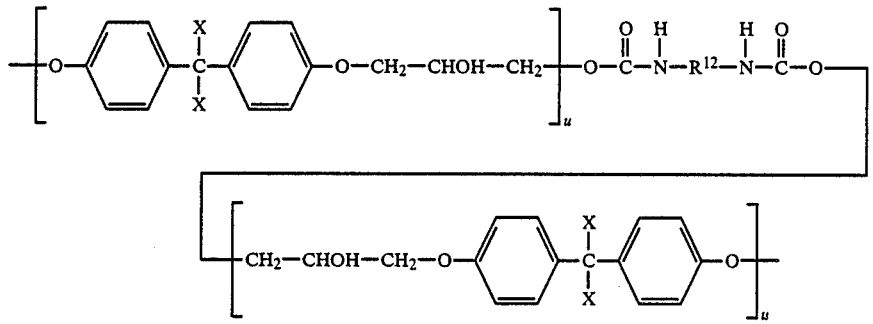

in which X and u have the meaning mentioned and $R^{12}$ is alkylene of 2 to 18 carbon atoms, the radical of a poly-(sec.)amine or amino-functional polytetrahydrofuran.

In a further embodiment, R in the formula (I) has the structure

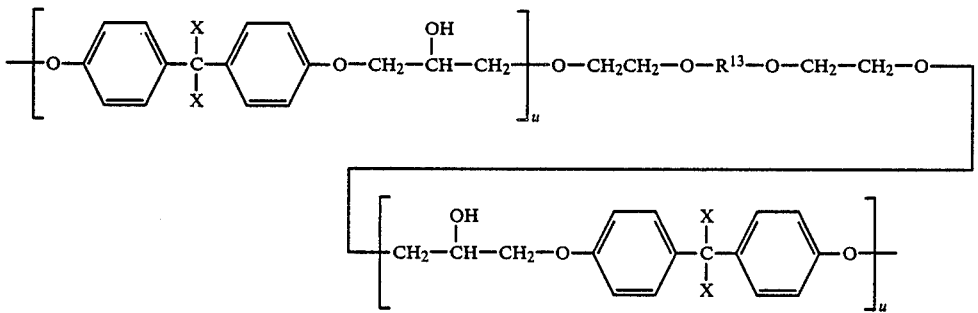

in which X and u have the meaning mentioned, u preferably being 1, however, and $R^{13}$ represents the radical

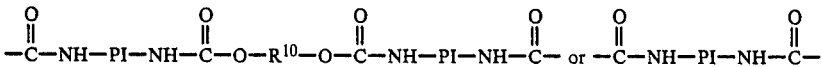

where $R^{10}$ and PI have the previously mentioned definitions.

Furthermore, some or all of the hydroxyl or amino groups present in the compounds of the formula (II) or (IIa) can have been reacted with partially blocked polyisocyanates.

Particular interest extends to those products where a primary or secondary amino group is present as a further amino group. In this way, the amount of basic nitrogen groupings remaining after the curing can be significantly reduced in the molecule.

The invention also provides a process for preparing these aminourethanes, which comprises reacting ($\alpha$) polyamines of the general formula (I)

in which $R^1$ to $R^3$ and A have the above meaning, with ($\beta$) oligomeric or polymeric compounds which contain at least one, preferably two to five and in particular two, terminal 2-oxo-1,3-dioxolane groups, if desired in the presence of chain stoppers.

The amount of polyamine ($\alpha$) is in general 35 to 85 mol-%, preferably 50 to 60 mol-%, and that of component ($\beta$) 65 to 15 mol-%, preferably 40 to 50 mol-%.

If in the above formula (I) of component ($\alpha$) the symbol A stands for a chemical bond, the polyamines which are usable according to the invention have the formula

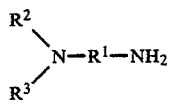

where $R^1$ to $R^3$ have the abovementioned definitions. Examples of such polyamines are: N-methylethylenediamine, hydroxyethylaminoethylamine, hydroxyethylaminopropylamine, N,N'-dimethylethylenediamine, N,N'-dimethylpropylenediamine, N,N'-dihydroxyethylethylenediamine; ethylenediamine, propylenediamine, hexamethylenediamine, octamethylenediamine, triacetonediamine, dioxadecanediamine, dioxadodecanediamine and higher homologs; cycloaliphatic diamines such as 1,4-cyclohexanediamine, 4,4'-methylenebiscyclohexylamine and 4,4'-isopropylenebiscyclohexylamine, isophoronediamine and N-aminoethylpiperazine. It is of course also possible to use mixtures of these polyamines with one another, including for example mixtures of diprimary with monoprimary polyamines as well as with those of the formula (Ib) below. The resulting mixtures of aminourethanes are likewise highly suitable for the purposes according to the invention.

In the above formula (I), A can also stand for $-(R^1NH)_r-R^1-NH-$. Component ($\alpha$) then thus has the formula

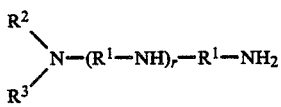

in which $R^1$ to $R^3$ have the above meaning and r stands for 1 to 6, preferably 1 to 4.

Examples thereof are: diethylenetriamine, dipropylenetriamine, bishexamethylenetriamine, triethylenetetramine, tetraethylenepentamine, pentaethylenehexamine, heptaethyleneoctamine and the like.

The oligomeric or polymeric compound ($\beta$) preferably has the general formula (III)

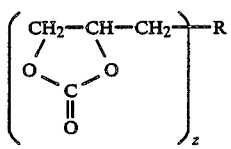

in which R has the above meaning but corresponds in its valence to z, and z stands for whole numbers from 1 to 5, preferably 2 and 3 and in particular 2.

In this formula, R is preferably the radical of a polyether, of a polyetherpolyol, of a polyester, or of a polyesterpolyol, an alkylene radical, a poly(sec.-)amineradical or even a reaction product of an epoxy-carbonate compound with polyamines, aliphatic or aromatic polyols, of novolaks, polycaprolactonepolyols, OH-containing polyesters, polyethers, polyglycols, hydroxyl-, carboxyl- and amino-functional polymer oils, polycarboxylic acids, hydroxy- or amino-functional polytetrahydrofurans and reaction products of polyamines with glycidyl esters of α-alkylalkanemonocarboxylic acids and/or α,α-dialkylalkanemonocarboxylic acids of the empirical formula $C_{12-14}H_{22-26}O_3$ (Versatic acids), individually or mixed. The α-alkylalkanoic and α,α-dialkylalkanoic acid mixtures represent monocarboxylic acids which contain a $C_9$-, $C_{10}$- and $C_{11}$- chain. The esters are referred to hereinafter as Versatic acid glycidyl esters. Hydroxyl-, carboxyl- and amino-functional polymer oils represent commercially available and are modified polybutadienes having a molecular weight of 800 to 10,000.

The molecular weight $M_w$ (weight average, determined by means of gel chromatography, polystyrene standard) of compounds of the formula (III) is in general between 300 and 10,000, preferably between 800 and 4,000.

The compounds of the formula (III), as well as the compounds (IV) and (V) described hereinafter, can be prepared by addition of $CO_2$ onto the corresponding epoxy-containing compounds. Processes of this kind are described for example in PCT(WO) Patent Application No. 84/03,701 and in DE patent applications Nos. P 35 29 263.6 and P 36 00 602.5. The disclosure therein, including the preferred embodiments, is incorporated herein by reference. Suitable starting polyepoxides ae listed for example in Wagner/Sarx, "Lackkunstharze", Carl Hansa Verlag (1971), page 174 et seqq. and in EP Offenlegungsschrift 60,506, which is likewise incorporated herein by reference.

Preferred starting materials for preparing the cyclic carbonates (III) and the mixed epoxide-carbonate compounds (IV) are the polyglycidyl ethers of polyphenols, for example bisphenol A. The glycidyl ethers are obtained for example by reacting a polyphenol with epichlorohydrin. Polyphenols are for example bis(4-hydroxyphenyl)-2,2-propane, bis(4-hydroxyphenyl)-methane, 4,4'-dihydroxybenzophenone, bis(4-hydroxyphenyl) 1,1'-ether, bis(4-hydroxyphenyl)-1,1'-isobutane, bis(2-hydroxynaphthyl)methane, 1,5-dihydroxynaphthalene. Preferably, free hydroxyl groups in addition to the epoxy groups are contained in the polyglycidyl ether of the polyphenol.

The reaction of components ($\alpha$) and ($\beta$) is in general effected in the requisite stoichiometric ratios or amounts by customary methods at elevated temperatures, if desired in the presence of catalysts and if desired in the presence of inert solvents. The reaction according to the invention in the presence of solvents which are inert toward the cyclocarbonate group is a preferred process variant. The stoichiometric evaluation of the starting materials and also of the reaction products in respect of the progress of the reaction is based in the case of the compounds of component ($\alpha$) on the amine number, which can be determined in a conventional manner by perchloric acid titration, and in the case of the compounds of component ($\beta$) on the cyclocarbonate equivalence number, which can be determined in a conventional manner by titration with potassium hydroxide solution. In the reaction according to the invention of component ($\alpha$) and component ($\beta$), the polyamino compounds according to the invention can be fed into the reaction individually or as mixtures or even in chronological succession, if desired dissolved in inert organic solvents. In a similar way, individual or different modified cyclic carbonates of component ($\beta$) can likewise be fed into the reaction individually or as mixtures or even in chronological succession, preferably in a mixture with organic solvents which are inert toward cyclocarbonate groups.

In the case of the reaction according to the invention care must be taken to maintain reaction and process conditions under which the cyclocarbonate groups of component (β) can react only with the primary amino groups of component (α), which is achievable by known methods, without corresponding reactions also taking place with the secondary amino groups present, which are less reactive.

According to one embodiment of the invention, it is possible to prepare the reaction product according to the invention as a self-curing compound. To this end partially blocked polyisocyanates are added onto any hydroxyl or secondary amino groups present in the cyclic carbonate. The hydroxyl groups can also be formed by addition of formaldehyde onto an aromtic nucleus of the phenolic component. This reaction is carried out under such conditions that the cyclic carbonate is not attacked.

Polyisocyanates which are used for these compounds having the radical PI can be of any desired type, for example aliphatic, cycloaliphatic or aromatic polyisocyanates. Some of the isocyanate groups can have been reacted in a known manner with customary blocking agents. Typical examples of the polyisocyanates used are xylylene diisocyanate, diphenylmethane 4,4'-diisocyanate, triphenylmethyl 4,4'-triisocyanate, triphenylmethane triisocyanate, polyphenylpolymethyl isocyanate, 2,2,4(2,4,4)-methylcyclohexyl diisocyanate, dicyclohexylmethyl diisocyanate, diethylfumarhexyl isocyanate, bis-(3-methyl-4-isocyanatocyclohexyl)-methane, 2,2-bis-(4-isocyanatocyclohexyl)propane, the methyl ester of lysine diisocyanate, the biuret of hexamethylene diisocyanate, diisocyanates of dimeric acids, 1-methylbenzene 2,4,5-triisocyanate, biphenyl 2,4,4'-triisocyanate, the triisocyanate from 3 moles of hexamethylene diisocyanate and 1 mole of water having a 16% NCO content and further compounds which contain at least two NCO groups per molecule, preferably isophorone diisocyanate, hexamethylene diisocyanate, trimethylhexamethylene diisocyanate, tetramethylhexamethylene diisocyanate, but in particular 2,4- or 2,6-toluylene diisocyanate or mixtures of these compounds. The polyisocyanates from which the radical PI in the compounds is derived can be identical or different.

In addition to these simple polyisocyanates it is also possible to use those which contain heteroatoms in the radical linking the isocyanate groups. Examples thereof are polyisocyanates which have carbodiimide groups, allophonate groups, isocyanurate groups, urethane groups, acylated urea groups and biuret groups.

Suitable polyisocyanates are finally also the known prepolymers which have terminal isocyanate groups and which are accesible in particular by racting the abovementioned simple polyisocyanates, in particular diisocyanates, with substoichiometric amounts of organic compounds having at least two groups which are reactive toward isocyanate groups. Preferably, however, these prepolymers are used as external curing agent component in the nonself-crosslinking systems.

Suitable blocking agents are aliphatic, cycloaliphatic or alkylaromatic (monohydric) alcohols, for example lower aliphatic alcohols such as methyl, ethyl, the various propyl, butyl and hexyl alcohols, heptyl, octyl, nonyl, decyl alcohol and the like, furthermore unsaturated alcohols such as allyl alcohols, cycloaliphatic alcohols such as cyclopentanol, cyclohexanol, alkylaromatic alcohols such as benzyl alcohol, methylbenzyl, p-methoxybenzyl and p-nitrobenzyl alcohol, and monoethers of glycols such as ethylene glycol monoethyl ether, monobutyl ether and the like. Further blocking agents are ketoximes, expediently of 3 to 20 carbon atoms, preferably 3 to 10 carbon atoms, such as acetone oxime, methyl ethyl ketone oxime (=butanone oxime), hexanone oxime (such as methyl butyl ketone oxime), heptanone oxime (such as methyl n-amyl ketone oxime), octanone oxime and cyclohexanone oxime, CH-acidic compounds such as alkyl malonates, acetoacetic esters and cyanoacetic esters having in each case 1 to 4 carbon atoms in the ester group, NH-acidic compounds such as caprolactam, aminoalcohols such as diethylethanolamine. Phenol, which is a known blocking agent, can be used in those cases where the reaction product is used for preparing solvent-containing paints.

The reaction products according to the invention can be prepared by various processes. For example, a compound of the formula (III) in which R can be for example the radical of a polyglycidal ether of bisphenol A where the epoxy groups have been converted into carbonate groups, can be reacted with a compound of the formula (I) in which $R^2$ and $R^3$ have the stated meaning. To obtain a self-curing product, the compound (III) is reacted first via OH groups present with a partially blocked polyisocyanate to form a urethane, after which the reaction with compound (Ia) takes place. It is also possible first to react partially blocked polyisocyanates with an aminoalkylation product which has on average at least one NH group per molecule and which has been obtained from phenol and/or a substituted phenol, preferably monoalkylphenol, monoarylphenol or monoaralkylphenol having one or optionally two phenolic hydroxyl groups, a primary alkylamine and/or primary alkanolamine and/or primary-tertiary alkyldiamine and formaldehyde or a formaldehyde-donating compound, in a further reaction stage with a mixed epoxidecarbonate (see formula IV below), i.e. a compound in which starting epoxy compounds are still present in addition to cyclic carbonate groups. This again gives compounds having two carbonate groups of the formula (III).

On the other hand, however, it is also possible to add to the aminourethanes according to the invention for example a customary curing agent of the type used for non-self-crosslinking 2-component paints. Suitable for this purpose are for example: blocked polyisocyanates, for example of the type described above for the self-curing aminourethanes, furthermore β-hydroxyl esters of at least bifunctional polycarboxylic acids, reaction products of dialkyl malonates with aldehydes and ketones which react with the elimination of water to give unsaturated dicarboxylic acid esters (Knoevenagel synthesis), transesterification curing agents and Michael addition products, for example of the type described in DE Offenlegungsschriften Nos. 3,315,469 and 3,417,441 and in DE Patent Application No. P 36 02 981.5. These references, including the preferred embodiments, are incorporated herein by reference.

Suitable curing agent components for the aminourethanes according to the invention, preferably in nonaqueous paints, also include epoxy-containing compounds, such as, for example, low molecular weight polyepoxides, epoxy-containing copolymers and diglycidyl or polyglycidyl ethers of aliphatic or aromatic alcohols. Further suitable curing agent components also include oligomeric or polymeric compounds which contain at least two 1,3-dioxolane-2-one groups or at least one 1,3-dioxolane-2-one group and one epoxy group per module; they include for example the compounds (III) and (IV).

To confer the necessary flexibilization on the coating obtained using these reaction products, the compounds (I) and (III) can already have the necessary prerequisites. On the other hand, it is also possible to introduce the necessary flexibilization into the system either via the built-in curing agent in the form of partially blocked polyisocyanates or via the admixed curing agent.

However, this flexibilization, as already mentioned above, can also be effected via compounds of the formula (III). The starting point for this option is for example mixed epoxide-carbonates which are those of the general formula (IV)

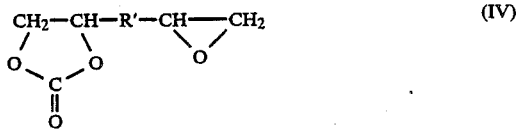

where R' has the meaning mentioned in formula (III). These mixed epoxide-carbonates are reacted with compounds which exert a flexibilizing effect on the molecule, for example the already abovementioned polyamines, aliphatic or aromatic polyols, such as diols, triols or tetraols, for example ethylene glycol, propylene glycol, polyalkylene glycols, neopentylglycol, glycerol, trimethylolpropane, pentaerythritol and polycaprolactonepolyols, furthermore OH-containing polyesters, polyethers, polyglycols, hydroxyl-, carboxyl- and amino-functional polymer oils, polycarboxylic acids, hydroxyl- and amino-functional polytetrahydrofurans and reaction products of polyamines with glycidyl esters of Versatic acid. These reactions are carried out under conditions where only the remaining epoxy groups react and the carbonate groups are not attacked. This again also leads to compounds of the formula (III) which contain terminal cyclic carbonate groups which can be reacted with the amino compounds (I). The terminal amino groups can be reached with chain stoppers, i.e. for example monocarbonates, monoepoxy compounds and partially blocked polyisocyanates, in one or more separate stages. In this way the structural units (a) to (d) are formed on the terminal amino groups. In this connection it is also possible first to react the polyamines (I) in which at least one of the two radicals $R^2$ and $R^3$ denote hydrogen in an appropriate manner with these chain stoppers (blocking agents) and to react these polyamines thus partially blocked and now only monoprimary, if desired together with diprimary polyamines, with the compounds ($\beta$). This option is attractive in particular in the case of blocking agents which lead to structural units (c) ($\leftarrow$ partially blocked polyisocyanate) or (d) ($\leftarrow$ monocarbonate, monoepoxide).

Suitable monocarbonate compounds for this purpose are those of the formula (V)

in which $R^{15}$ represents hydrogen, alkyl of 1 to 18, preferably 1 to 10, carbon atoms, or radicals of the glycidal ester of Versatic acid, glycidyl esters or glycidyl ethers where the epoxy group has been reacted in the abovementioned manner to give cyclic carbonates.

In addition to the monocarbonates and monoepoxides, it is also possible to use partially blocked polyisocyanates, since these compounds react first with a free $NH_2$ group. In principle any amine reaction which preferentially starts at the primary amino group before the secondary amino groups present in the molecule react can be used. On the other hand, the compound used for chain termination can also be used for flexibilizing the resulting coating by incorporating appropriate long-chain compounds which are known in the field.

To arrive at the structural units (a) or (b), monocarbonates conforming to the above formula (V) can be selectively reacted at the epoxy group with polyols which contain the radical B or with monocarboxylic acids of the formula

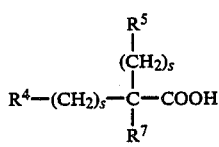

All or some of any OH groups present can then be reacted with partially blocked polyisocyanates. The modified carbonate compound thus obtained can then be used analogously to the monocarbonates listed under formula (V), i.e. they can be reacted in a mixture with the cyclocarbonate compounds of formula (III) with the polyamines of the formula (I) to give the aminourethanes according to the invention. Alternatively, the diprimary polyamine (I) can be initially selectively reacted at a primary amino group with this modified monocarbonate compound and then, if desired in a mixture with further diprimary amine, with the cyclocarbonate compound (III).

Structural units (c) are obtained for example by selectively reacting a diprimary polyamine of the formula (I) at a primary amino group with a partially blocked polyisocyanate to give a urea derivative. The monoprimary polyamine thus prepared is then, if desired in admixture with further diprimary polyamine, reacted with cyclocarbonates of formula (III) to give the aminourethanes according to the invention.

To obtain structural units (d), for example monocarbonates of the formula (V) or corresponding monoepoxides are used analogously to the method described above.

The temperature of the reaction of components ($\alpha$) and ($\beta$) is in general 20° to 150° C., preferably 50° to 100° C. The reaction is generally continued until for example a constant amine number of the compounds according to the invention is reached.

The conditions in the preparation of the starting components (see also section I to VII of the Examples) and in the preparation of the aminourethanes according to the invention ($\rightarrow$ section VIII of the Examples) can vary within wide limits. The directions given in the Examples are therefore only intended for guidance. The use of small amounts of a suitable catalyst, such as basic compounds, is also possible in the reactions.

The reaction products according to the invention are used for example not only for preparing paint formulations of conventional composition but also for preparing aqueous systems which product coatings having very good properties.

They are suitable in particular for electrodeposition, although they can also be used for other coating methods, for example for solvent-containing systems. To obtain aqueous formulations, it is advantageous to neutralize some or all of the basic amino groups in order thereby to obtain coating compositions which can be electrodeposited from aqueous solution at a bath pH between about 3 and 9.

The neutralization of the basic groups is in general effected with water-soluble acids, for example formic acid, acetic acid, lactic acid or phosphoric acid. The amount of acid added depends in the individual case on the properties of the resin used and is in general continued only until the resin is solubilized or dispersed.

Aqueous formulations which have a particularly low content of volatile organic solvents are obtained for example by distilling off the solvents contained in the binders from the synthesis or solution. Preferably this process step is carried out under reduced pressure.

The paint formulations containing the aminourethanes according to the invention may also have added to them various additives such as pigments, pigment pastes, antioxidants, surface-active agents, solvents, flow control and thickening agents, reactive diluents, catalysts and the like. These additives are known and are customarily used in the paint industry. The electrodeposition of paint particles is effected by known processes, which are incorporated herein by reference. The deposition can be effected on all electroconductive substrates, for example metal such as steel, copper, aluminum and the like.

After the decomposition the coating is cured at elevated temperatures, which generally depend on the nature of the curing agent component, by customary processes, the temperatures used ranging from 100° to 220°, preferably from 130° to 180°.

In the Examples below, p is parts by weight and % is percent by weight. The amine numbers are always based on solid resin.

EXAMPLES

I. Partially blocked polyisocyanates

Self-curing compounds

1. To 174 p of toluene diisocyanate (2 equivalents of NCO; 80% of 2,4- and 20% of 2,6-isomer) were added at 60°–70° C. in the presence of 0.3% of benzyltrimethylammonium hydroxide ®(Triton B) as catalyst 137 p of 2-ethylhexanol (1.05 OH equivalents) and reacted until the NCO value was about 12.8%.

2. Example (I.1) was repeated, except that the 2-ethylhexanol was replaced by 94.5 p of ethylene glycol monoethyl ether (1.05 OH equivalents). The reaction was carried out until the NCO value was 14.8%.

Non-self-curing compounds

3. To 348 p of toluylene diisocyanate (4 equivalents) in 385 p of diglycol dimethyl ether were slowly added in the presence of 0.3% of Triton B as catalyst 550 p of ®Capa 200 (2 equivalents; trade name of a polycaprolactonediol having an average molecular weight of 550) at 50°–70° C. The reaction mixture was maintained at that temperature until the NCO value was 9.4% and had a solids content of 70%.

4. Example (I.3.) was repeated, except that the Capa 200 was replaced by 830 p of Capa 205 (2 OH equivalents; trade name of a polycarprolactonediol having an average molecular weight of 830). The reaction was continued until the NCO value was 7.1%.

5. Example (I.3.) was repeated, except that the toluylene diisocyanate was replaced by 444 p of isophorone diisocyanate (4 equivalents). NCO value=6.6%.

II. Reactions with partially blocked polyisocyanates

1. To 540 p of Capa 305 (3 OH equivalents; trade name of a polycaprolactonetriol having an average molecular weight of 540) in 628 p of diglycol dimethyl ether were added at 40°–60° C. in the presence of 0.3% of triethylamine as basic catalyst 915 p of compound I.1.) (3 NCO equivalents), and the reaction was continued until the NCO value had dropped to 0%. The product is present as a 70% strength solution.

2. To 134 p of dimethylolpropionic acid (2 OH equivalents) were slowly added at 30°–60° C. in the presence of 0.3% of zinc acetylacetonate as catalyst 615 p of compound (I.1) (2 NCO equivalents) until the NCO value had dropped to about 0% (acid number 75 mg of KOH/g). It is also possible to add as a solubilizer about 500 p of 2-butanone, which, after the reaction, can be distilled off again under reduced pressure.

3. To 268 p of dimethylolpropionic acid were added as described in II.2 615 p of compound (I.1) (2 NCO equivalents) and 1,683 p of compound (I.3) (2 NCO equivalents, 70% strength), if desired after addition of 2,000 p of 2-butanone as solubilizer. Acid number=54.5.

4. Example (II.3) was repeated using 536 p of dimethylolpropionic acid (8 OH equivalents), 1,842 p of compound (I.1) (6 NCO equivalents) and the subsequent addition of 1,683 p of compound (I.3) (2 NCO equivalents, 70% strength). Acid number=63.1.

5. 236 p of methylolpropionic acid (2 OH equivalents) were reacted as in Example (II.2) with 1,820 p of compound (I.5) (2 NCO equivalents, 70% strength). NCO value about 0%. Optional solubilizer: 1,000 p of 2-butanone. Acid number=74.3.

In Examples (II.2)–(II.5) the 2-butanone can also be replaced by diglycol dimethyl ether as solubilizer, the solvent remaining in the reaction material after the reaction has taken place. The choice of the solvent depends on the conditions used in IV.

6. To 1,195 p of compound (VI.1) (see there) (2 carbonate equivalents, 2 primary OH equivalents, 80% strength) were added at 40°–80° C. in the presence of 0.3% of zinc acetylacetonate as catalyst 1,820 p of compound (I.5) (2 NCO equivalents, 70% strength) and reacted until the NCO value was about 0%.

Diglycol dimethyl ether was then used to standardize to a solids content of 70%.

Carbonate equivalent weight about 1,115.

7. Example (II.6) was repeated, except that 683 p of compound (VI.1) (1 carbonate equivalent, 1 primary OH equivalent, 80% strength) were reacted with 307 p of compound (I.1) (1 NCO equivalent) until the NCO value was about 0%. Carbonate equivalent weight about 785. Diglycol dimethyl ether was then used to standardize to a solids content of 70%.

8. Example (II.7) was repeated, except that compound (VI.1) was replaced by 1,333 p of compound (VI.2) (1 carbonate equivalent, 1 primary OH equivalent, 80% strength) and 921 p of compound (I.1) (3 NCO equivalents). Carbonate equivalent weight about 1,987.

9. Example (II.7) was repeated, except that compound (III.1) was replaced by 1,195 p of compound (VI.3) (1 carbonate equivalent, 80% strength, 2 primary OH equivalents) and 615 p of compound (I.1) (2 NCO equivalents). Carbonate equivalent weight about 1,571.

10. To 540 p of Capa 305 (3 OH equivalents) in 666 p of digylycol dimethyl ether were added to 40°–80° C. in the presence of 0.3% of zinc acetylacetonate 615 p of compound (I.1) and reacted until the NCO value was about 0%. The OH groups still present in the reaction mixture were subsequently reacted at 40°–80° C. with 222 p of isophorone diisocyanate (2 NCO equivalents) until the NCO value was about 3.0%. The solution obtained was added at 10°–30° C., with or without cooling, to 176 p of 4,7-dioxadecane-1,10-diamine and reacted until the amine number was about 36 mg of KOH/G (expressed relative to solid resin). The product obtained had a solids content of 70% in diglycol dimethyl ether.

11. To 103 p of diethylenetriamine (2 equivalents of primary amine) were added 307 p of compound (I.1) (1 NCO equivalent) and maintained at 10°–30° C. until the NCO value had dropped to about 0%. Amine number 275 mg of KOH/g (based on solid resin).

12. Example (II.6) was repeated, except that compound (III.1) was replaced by 1,165 p of compound (VI.4) (2 equivalents of primary OH, 2 equivalents of carbonate, 80% strength). Carbonate equivalent weight about 1,103.

Fully blocked isocyanates

13. To 186.5 g (0.84 mol) of isophorone diisocyanate in 149 g of diglycol dimethyl ether were added at 50° C. in the presence of 0.35 g of zinc acetylacetonate 35.6 g (0.27 mol) of trimethylolpropane a little at a time. The mixture was then heated at 60° C. for 3 hours (NCO: 9.6%; theory: 9.96%). 126.1 g (0.88 mol) of 2-octanone oxime were added dropwise at 60° C. to this reaction mixture, which was subsequently stirred at 60° C. for 2 hours (NCO: <0.1%).

14. To 130.5 g (0.75 mol) of toluylene diisocyanate (80% of 2,4- and 20% of 2,6-isomer) in 118 g of diglycol dimethyl ether were added at 50° C. in the presence of 0.28 g of zinc acetylacetonate 31.8 g (0.24 mol) of trimethylpropane a little at a time and reacted until the NCO value was 11.73% (theory: 11.79%). 112.6 g (0.79 mol) of 2-octanone oxime were then added dropwise at 60° C. to this reaction mixture, which was subsequently stirred at 60° C. for 2 hours (NCO: <0.1%).

III. Reactions of biscarbonates and partially blocked polyisocyanates.

1. To 1,759 p of a biscarbonate based on ®Epicote 1001 (2 equivalents of carbonate; 60% strength in diglycol dimethyl ether) were slowly added at 60°–80° C. 618 p of compound (I.1.) (2 NCO equivalents) and reacted in the presence of 0.3% of Triton B until the NCO value was about 0%. The product is 70% strength and has a carbonate equivalent of 835.

2. Example (III.1.) was repeated, except that 1,507 p of the biscarbonate based on Epicote 1001 and 268.5 p of compound (I.2.) were added. After addition of 113 p of diglycol dimethyl ether a 70% strength solution of the product is obtained. Carbonate equivalent weight: 658.

3. To 5,182 p of compound (VI.7.) (see there) (2 equivalents of carbonate; 70% strength diglycol dimethyl ether) were slowly added at 60°–80° C. 1,236 p of the partially blocked tolylene diisocyanate (I.1.) (4 NCO equivalents) and reacted in the presence of 0.3% of Triton B until the NCO value was about 0%. The product obtained was standardized with 530 p of diglycol dimethyl ether to a solids content of 70%. Carbonate equivalent weight about 2,432.

4. to 6. Example (III.3.) was repeated, except that compound (VI.7.) was replaced by the products listed in Table 1 below.

TABLE 1

|  | Replacement of VI.7 by | | | Carbonate equivalent |
| --- | --- | --- | --- | --- |
|  | VI.12 | VI.13 | VI.14 | weight |
| Example 4 | 5,582 | | | 2,572 |
| Example 5 | | 3,654 | | 1,897 |
| Example 6 | | | 4,054 | 2,037 |

7. To 2,374 p of compound (VI.5 (see there (2 equivalents of carbonate, 2 equivalents of secondary OH, 70% strength) were added at 40°–80° C. in the presence of 0.3% of zinc acetylacetonate as catalyst 307 p of compound (I.1) (1 NCO equivalent) and reacted until the NCO value was about 0%. Diglycol dimethyl ether was added to standardize to a solids content of 70%. Carbonate equivalent weight 985.

IV. Formaldehyde phenol adducts 1. 220 p of p-nonylphenol and 129 p of 2-ethylhexylamine were introduced with cooling into 182 p of toluene. After the mild exothermic reaction had ceased, 33 p of 91% strength paraformaldehyde were added, and the reaction material was slowly heated to 80°–100° C. This temperature was maintained until about 20 p of water had been separated off. The product obtained had an amine number of 155 mg of KOH/g. The solution was freed of toluene at 80°–100° C. under reduced pressure and standardized with diglycol dimethyl ether to a solids content of 70%.

V. Bisphenols 1. 758 p of compound (IV.1.) (2 equivalents of secondary amine, 70% strength) and 1,283 p of compound (I.3.) (2 NCO equivalents, 70% strength) were mixed at 40°–60° C. and treated at that temperature until the amine number and the NCO value had decreased to zero.

2. Example (V.1.) was repeated, except that compound (I.3.) was replaced by 1,683 p of compound (I.4.).

VI. Reaction products of carbonate/epoxy compound and polyol 1. 416 p of the monocarbonate of ®Epicote 828 (1 epoxy equivalent) were dissolved in 310 p of ethylene glycol (5 mol) and reacted at 100°–150° C. in the presence of 0.2% of potassium iodide until the epoxy number was about 0. Excess ethylene glycol was then distilled off under reduced pressure, and the batch was standardized with diglycol dimethyl ether to a solids content of 80%. Carbonate equivalent weight about 478.

2. Example (VI.1) was repeated using as epoxy component 1,210 p of the monocarbonate of ®Epicote 1001 (80% strength in diglycol dimethyl ether, 1 epoxy equivalent). Carbonate equivalent weight about 1,066.

3. 416 p of the monocarbonate of ®Epicote 828 (1 epoxy equivalent), 540 p of Capa 305 and 240 p of diglycol dimethyl ether were heated to about 60° C., and up to 0.3% of boron trifluoride etherate was added a little at a time. The reaction was continued at 80°–150° C. until the epoxy number was about 0. The product obtained is about 80% strength, carbonate equivalent weight about 956.

4. Example (VI.1) was repeated using as the epoxy component 404 p of a monocarbonate based on ®Denacol EX 920 (trade name for a polyoxypropylene glycol diglycidyl ether from Nagase, Japan—1 epoxy equivalent). Carbonate equivalent weight about 466.

5. 832 p of the monocarbonate of ®Epicote 828 (2 epoxy equivalents), 830 p of Capa 205 and 712 p of diglycol dimethyl ether were mixed and made to react at 70°-140° C. in the presence of about 0.3% of boron trifluoride etherate until the epoxy number was about 0. The 70% strength product (diglycol dimethyl ether) has a carbonate equivalent weight of about 831.

6. 832 p of the monocarbonate of bisphenol A diglycidyl ether (epoxy number 3.9), 2,300 p of compound (V.1.) (2 equivalents of phenolic OH, 70% strength) and 357 p of diglycol dimethyl ether were mixed and reacted at 70°-100° C. in the presence of 1% of triethylamine, based on solid resin, until the epoxy number was about zero. The product is 70% strength in diglycol dimethyl ether and has a carbonate equivalent weight of about 1,226.

7. 2,510 p of the monocarbonate of Epicote 1001 (epoxy number about 1.5, 80% strength), 2,314 p of compound V.1.) (2 equivalents of phenolic OH, 70% strength in diglycol dimethyl ether), and 358 p of diglycol dimethyl ether were mixed and reacted analogously to VI.1.) until the epoxy number was about zero. The 70% strength product in diglycol dimethyl ether has a carbonate equivalent weight of about 1,814.

8. to 11. Example (VI.1.) was repeated, except that compound (V.1.) was replaced by the hydroxyl compounds listed in Table 2 using 0.3% of boron trifluoride diethyl etherate. The resulting compounds had the carbonate equivalent weights reproduced in Table 2. The designation PG 600 stands for polyethylene glycol having an average molecular weight of 600.

TABLE 2

| | | Replacement of V.1) by p of (2 OH equivalents, 70% strength) | | | Carbonate equivalent weight |
|---|---|---|---|---|---|
| | | V.2.) | Capa 200 | Capa 205 | PG 600 | |
| VI. | Example 8 | 2,714 | | | | 1,366 |
| | Example 9 | | 786 | | | 691 |
| | Example 10 | | | 1,186 | | 831 |
| | Example 11 | | | | 857 | 716 |

12. to 14. Example (VI.2.) was repeated, except that here too compound (V.1.) was replaced by the hydroxyl compounds listed in Table 3.

TABLE 3

| | | Replacement of V.1) by p of (2 OH equivalents, 70% strength) | | | Carbonate equivalent weight |
|---|---|---|---|---|---|
| | | V.2.) | Capa 200 | Capa 205 | |
| VI. | Example 12 | 2,714 | | | 1,954 |
| | Example 13 | | 786 | | 1,279 |
| | Example 14 | | | 1,186 | 1,419 |
| VII. | Reaction products of carbonate/epoxy compound and carboxylic acid | | | | |

1. 1,510 p of compound (II.5) (2 COOH eqivalents) and 832 p of a monocarbonate based on ®Epicote 828 (2 epoxy equivalents) were reacted in the presence of 0.2-0.4% of ®Cordova Accelerator AMC-2 as catalyst at 50°-100° C. until the epoxy number was about 0 and the acid number <5 mg of KOH/g of solid resin. If desired, it is possible to add about 1,000 p of 2-butanone as a solubilizer, which are subsequently distilled off again under reduced pressure. The reaction product was standardized with about 1,000 p of diglycol dimethyl ether to a solids content of 70%. The reaction can also be carried out in the presence of diglycol dimethyl ether with a 70% solids content using 0.5-1% of triethylamine at 70°-140° C. until the characteristic numbers mentioned above are obtained. Carbonate equivalent weight about 1,171.

2. 3,652 p of compound (II.3) (4 COOH equivalents) and 1,664 p of a monocarbonate based on ®Epicote 828 (4 epoxy equivalents) were reacted as described in Example (VII.1). Epoxy number about 0, acid number <5 mg of KOH/g.

3. Example (VII.2) was repeated, except that compound (II.3) was replaced by a mixture of 2,157 p of compound (II.2) (2 COOH equivalents) and 1,498 p of compound (II.1) (2 COOH equivalents). Carbonate equivalent weight about 1,329.

VIII. Preparation of binders 1.1. To 1,497 p of biscarbonate based on Epicote 1001 (2 carbonate equivalents, 70% strength in diglycol dimethyl ether) were added 204 p of N,N-dimethylaminopropylamine at 60°-80° and reacted until an amine number of 89.5 mg of KOH/g was obtained. The product obtained was standardized with methoxypropanol to a solids content of about 70%.

1.2. 63 p of compound (VIII.1.1.) were mixed with 37 p of compound (II.1.). Addition of 5 p of dibutyltin dilaurate and 366 p of deionized water gave a 15% strength clearcoat solution with an MEQ value of 70 (mmol of formic acid/100 g of solid resin) and a pH value of 6. The clearcoat solution gave up to 250 volts of depositable film which was cured at 160° C. for 20 minutes and had a thickness of 20 μm in the case of a depositing voltage of 200 volts.

2.1. To x p of diamine (2 equivalents of primary amine) were added 305 p of partially blocked polyisocyanate I.1.) (1 NCO equivalent) and maintained at 20°-40° C. until the NCO value had dropped to 0%.

TABLE 4

| Amine | x(p) | Amine number (mg of KOH/g of solid resin) |
|---|---|---|
| 2.1.1. Diethylenetriamine | 103 | 275 |
| 2.1.2. Triethylenetetramine | 146 | 373 |

2.2. To 4,737 p of compound (III.1.) (4 carbonate equivalents) and 1,974 p of compound (VI.9.) (2 carbonate equivalents) were added at 60°-80° C. 352 p of 4,7-dioxadecane-1,10-diamine (4 equivalents of primary amine), 408 p of the above compound 2.1.1.) (1 equivalent of primary amine) and 451 p of the above product 2.1.2) (1 equivalent of primary amine) and reacted until the amine number was 28.5 mg of KOH/g of solid resin. Methoxypropanol was then used to standardize to a solids content of 70%. By adding deionized water it was possible to prepare therefrom a 15% strength clearcoat solution having an MEQ value of about 20 and a pH value of 6.6. The rupture voltage was less than 450 volt, and a deposition voltage of 300 volts gave a thickness of 20 μm which was baked at 160° C. in the course of 20 minutes to form a hard coat.

3. To 4,123 p of compound (III.2.) (4.4 carbonate equivalents) and 304 p of a carbonate based on the glycidyl ester of Versatic acid (1 carbonate equivalent) were added at 60°-80° C. 206 p of diethylenetriamine and reacted until the amine number was 33 mg of KOH/g of solid resin. To this solution was added a mixture comprising 102 p of N,N-dimethylaminopropylamine and 262 p of methoxypropanol while maintaining the above-stated temperature. The amine number was 48.1 mg of KOH/g of solid resin; solids content of 70%. MEQ value 50 (15% strength clearcoat solution) pH value 6.1.

4. To 4,123 p of comound (III.2.) (4.4 carbonate equivalents) and 608 p of a carbonate based on the glycidyl ester of Versatic acid (2 carbonate equivalents) were added at 60°–80° C. 438 p of triethylenetetramine, and the reaction was continued until the amine number was 86 mg of KOH/g of solid resin. The reaction material was standardized with methoxypropanol to a solids content of 60%. MEQ value 50 (15% strength clearcoat solution), pH 6. The rupture voltage was 400 volt, and using a deposition voltage of 200 volt a dry film thickness of 12–14 μm was obtained (baked at 160° C. for 20 minutes).

5. To 2,370 p of compound (III.1.) (2 carbonate equivalents) were added 204 p of N,N-dimethylaminopropylamine at 60°–80° C., and the reaction was continued until the amine number was about 60 mg of KOH/g of solid resin. The reaction material was standardized with methoxypropanol to a solids content of 60%. MEQ value 50 (15% strength clearcoat solution) pH value of 7.3, rupture voltage about 250 volt.

6. To 4,740 p of compound (III.1.) (4 carbonate equivalents) were added 204 p of N,N-dimethylaminopropylamine and 103 p of diethylenetriamine at 60°–80° C. The solid resin obtained had an amine number of 46 mg of KOH/g of solid resin and was standardized with methoxypropanol to a solids content of 60%. MEQ value 65 (15% clearcoat solution) pH value 6.8, rupture voltage 300 volt.

7. To 2,620 p (80% solids) of a biscarbonate based on Epicote 1001 (about 4 carbonate equivalents) were added 204 p of N,N-dimethylaminpropylamine and 103 p of diethylenetriamine at 60°–80° C. and reacted. Amine number about 70 mg of KOH/g of solid resin. The batch was standardized with methoxypropanol to a solids content of 60%. MEQ value 75 (15% strength clearcoat solution) pH value 7, rupture voltage about 300 volt.

8. 6,948 p of compound (III.1.) (2 carbonate equivalents) and 608 p of the carbonate based on the glycidyl ester of Versatic acid (2 carbonate equivalents) in 453 p of methoxypropanol were introduced first and heated to about 80° C. To this solution was slowly added a mixture of 272 p of pentaethylenehexamine (2 equivalents of primary amine, 85% strength according to amine number) and 176 p of 4,7-dioxadecane-1,10-diamine (2 equivalents of primary amine) and reacted for 4 to 8 hours until the amine number was 38 mg of KOH/g. The product had a solids content of 70% in a 9:2 mixture of diglycol dimethyl ether/methoxypropanol. The MEQ value was 35 and the pH value 6.2.

9. to 11. Example (8.) was repeated using the amounts of compounds (III.4.) to (III.6.) indicated in Table 5.

TABLE 5

|  | III.4 | III.5 | III.6 | Amine number | MEQ | pH | Solvent ratio |
|---|---|---|---|---|---|---|---|
| Example 9 | 7,348 |  |  | 36.2 | 30 | 6.4 | 5:1 |
| Example 10 |  | 5,420 |  | 46.3 | 35 | 6.1 | 7:2 |
| Example 11 |  |  | 5,820 | 44 | 30 | 6.5 | 4:1 |

12. 3,503 p of compound (VI.6.) (3 carbonate equivalents), 4,754 p of compound (III.1.) (4 carbonate equivalents), 608 p of the carbonate of the glycidyl ester of Versatic acid (2 carbonate equivalents) and 600 p of methoxypropanol were introduced first and heated to about 80° C. To this solution was slowly added a mixture of 440 p of tetraethylenepentamine (TEPA) (4 equivalents of primary amine, 85% strength according to amine number) and 352 p of 4,7-dioxadecane-1,10-diamine (4 equivalents of primary amine) and reacted for 8 hours until the amine number was 51 mg of KOH/g. The product had a solids content of 70% in diglycol dimethyl ether/methoxypropanol (4:1). MEQ value 25, pH value 6.

13. to 15. Example 12 was repeated, except that compound (VI.6.) and the tetraethylenepentamine were replaced by the compounds listed in Table (6).

TABLE 6

|  | VI.8 | VI.9 | VI.10 | PEHA | TEPA | TETA | Amine number | MEQ | pH |
|---|---|---|---|---|---|---|---|---|---|
| Example 13 | 3,905 |  |  |  | 440 |  | 45 | 30 | 6.0 |
| Example 14 |  | 1,975 |  | 272 |  | 146 | 55.3 | 25 | 6.2 |
| Example 15 |  |  | 2,375 | 272 |  | 146 | 52.8 | 25 | 6.1 |

PEHA = pentaethylenehexamine
TETA = triethylenetetramine 16. to 4,757 p of compound (III.1.) (4 carbonate equivalents) and 608 p of the carbonate of the glycidyl ester of Versatic acid (2 carbonate equivalents) was added a mixture of 220 p of TEPA (2 equivalents of primary amine, 85% strength according to amine number) and 352 p of 4,7-dioxadecane-1,10-diamine (4 equivalents of primary amine) at 80° C. The reaction was continued until the amine number was 37.4 mg of KOH/g, and the batch was standardized with 506 p of methoxypropanol to a solids content of 70%. MEQ value 25–30, pH 6.4.

17. To 2,377 p of compound (III.1.) (2 carbonate equivalents), 460 p of the bicarbonate of bisphenol A diglycidyl ether (2 carbonate equivalents) and 608 p of the carbonate of the glycidyl ester of Versatic acid was added a mixture of 220 p of TEPA (2 equivalents of primary amine) and 352 p of 4,7-dioxadecane-1,10-diamine (4 equivalents of primary amine) at 80° C. The reaction was continued until the amine number was 51 mg of KOH/g, and the batch was standardized with 703 p of methoxypropanol to a solids content of 70%. MEQ 30–35, pH 6.3.

18. to 818 p of compound (VI.11.) (0.8 carbonate equivalent), 6,504 p of compound (III.5.) (1.2 carbonate equivalents) and 608 p of the carbonate of the glycidyl ester of Versatic acid (2 carbonate equivalents) were added at 80° C. 292 p of TEPA (4 equivalents of primary amine). The reaction was continued until the amine number was 37 mg of KOH/g, and the batch was standardized with 386 p of methoxypropanol to a solids content of 70%. MEQ value 30, pH 6.5.

19. To 4,489 p of compound (II.9) (2 carbonate equivalents, 70% strength), 2,374 p of compound VI.5 (2 carbonate equivalents, 70% strength) and 2,376 p of compound (III.1) (2 carbonate equivalents, 70% strength) was slowly added a solution of 352 p of 4,7-dioxadecane-1,10-diamine (4 equivalents of primary amine), 210 p of tetraethylenepentamine (2 equivalents of primary amine) and 272 p of pentaethylenehexamine (2 equivalents of primary amine) in 2,700 p of methoxypropanol and reacted at 60°–90° C. until the amine number was about 44 mg of KOH/g. The binder obtained has a solids content of 70%.

20. 1,664 p of a monocarbonate based on ®Epicote 828 (4 epoxy equivalents), 1,080 p of Capa 305 (6 equivalents of primary OH), 830 p of Capa 205 (2 equivalents of primary OH) and 1,507 p of diglycol dimethyl ether were mixed and reacted at 70°–140° C. in the presence of about 0.3% of boron trifluoride etherate until the epoxy number was about 0. To this solution was added at 40°–80° C., in the presence of 0.3% of zinc acetylacetonate, 2,456 p of (I.1) (8 NCO equivalents) and reacted until the NCO value was about 0%. To this mixture were added 2,620 p of a biscarbonate based on ®Epicote 1001 (4 carbonate equivalents, 80% strength, in diglycol dimethyl ether), followed at 60°–90° C. by 210 p of tetraethylenepentamine (2 equivalents of primary amine), 272 p of pentaethylenehexamine (2 equivalents of primary amine) and 352 p of 4,7-dioxadecane-1,10-diamine (4 equivalents of primary amine) in 1,809 p of methoxypropanol. The reaction was continued until the amine number was about 44 mg of KOH/g, solids content 70%.

21. To a mixture comprising 4,779 p of compound (II.6) (3 carbonate equivalents, 70% strength), 1,576 p of compound (II.12) (1 carbonate equivalent, 70% strength) and 2,665 p of compound (VI.2) (2 carbonate equivalents, 80% strength) were added at 40°–80° C. in the presence of 0.3% of zinc acetylacetonate 2,440 p of compound (I.1) (8 NCO equivalents) and reacted until the NCO value was about 0%. To this solution was added a mixture of 210 p of tetraethylenepentamine (2 equivalents of primary amine), 174 p of N,N'-diaminopropylethylenediamine (2 equivalents of primary amine), 131 p of dipropylenetriamine (2 equivalents of primary amine) and 1,646 p of methoxypropanol at 60°–90° C., and the reaction was continued until the amine number was 35.3 mg of KOH/g. Solids content 70%.

22. To a mixture of 3,346 p of compound (VII.1) (2 carbonate equivalents, 70% strength), 4,737 p of compound (III.1) (4 carbonate equivalents, 70% strength) and 608 p of a carbonate based on the glycidyl ester of Versatic acid (2 carbonate equivalents) was added at 60°–90° C. a mixture of 420 p of tetraethylenepentamine (4 equivalents of primary amine), 352 p of 4,7-dioxadecane-1,10-diamine (4 equivalents of primary amine) and 591 p of methoxypropanol and reacted until the amine number was about 48.5 mg of KOH/g; solids content 70%.

23. To a mixture of 2,839 p of compound (II.8) (1 carbonate equivalent, 70% strength), 1,121 p of compound (II.7) (1 carbonate equivalent, 70% strength), 594 p of compound (III.1) (0.5 carbonate equivalent, 70% strength) and 2,815 p of compound (III.7) (2 carbonate equivalents, 70% strength) was added at 60°–90° C. a mixture of 210 p of tetraethylenepentamine (2 equivalents of primary amine), 104 p of diethylenetriamine (2 equivalents of primary amine), 250 p of bis(3-aminopropyl)polytetrahydrofuran 1100 (0.5 equivalent of primary amine) and 242 p of methoxypropanol, and the reaction was continued until the amine number was about 30 mg of KOH/g; solids content 70%.

24. To a mixture of 2,377 p of compound (III.1) (2 carbonate equivalents, 70% strength), and 2,374 p of compound (VI.5) (2 carbonate equivalents, 70% strength) was added at 60°–90° C. a mixture comprising 210 p of tetraethylenepentamine (2 equivalents of primary amine), 410 p of (II.10) (1 equivalent of primary amine), 2,218 p of (II.9) (1 equivalent of primary amine, 70% strength) and 266 p of methoxypropanol, and the batch was reacted until the amine number was about 40.8 mg of KOH/g; solids content 70%.

25. To a mixture of 7,594 p of (VII.2) (4 carbonate equivalents, 70% strength), 1,310 p of a biscarboante based on ®Epicote 1001 (2 carbonate equivalents, 80% strength in diglycol dimethyl ether) was added at 60°–90° C. a mixture comprising 210 p of tetraethylenepentamine (2 equivalents of primary amine), 176 p of 4,7-dioxadecane-1,10-diamine (2 equivalents of primary amine), 131 p of dipropylenetriamine (2 equivalents of primary amine) and 14 p of methoxypropanol, and the batch was reacted until the amine number was about 33 mg of KOH/g; solids content 70%.

26. 860 p of bishexamethylenetriamine (8 NH₂ equivalents) in 2,315 p of methoxypropanol were introduced first. To this solution were added at 20°–40° C. 622 p of compound (I.1) (2 NCO equivalents) and reacted until the NCO value was about 0%. 4,737 p of compound (III.1) (4 carbonate equivalents, 70% strength diglycol dimethyl ether), 3,246 p of compound (III.7) (2 carbonate equivalents, 70% strength diglycol dimethyl ether) were then added and reacted at 60°–90° C. until the amine number was about 32 mg of KOH/g; solids content 60%.

27. Preparation iof a non-self-curing binder (A) 830 p of Capa 205 (2 OH equivalents), 3.4 p of triethylamine, 486 p of diglycol dimethyl ether and 304 p of (2 mol of) tetrahydrophthalic anhydride were mixed and gradually heated to 80° C.–120° C. The reaction was continued until the acid number was 100 to 105. To this solution were added 832 p (2 epoxy equivalents) of a monocarbonate based on ®Epicote 828 and heated in the presence of AMC-2 to 100°–128° C. until the epoxy number was ∼0 and the acid number was <1.

(B) To 2,452 p of product A (80% in diglycol dimethyl ether), 608 p (2 carbonate equivalents) of a monocarbonate based on the glycidyl ether of Versatic acid, 4,491 p (6 carbonate equivalents) of a biscarbonate based on ®Epicote 1001, 1,075 p of bishexamethylenetriamine (10 equivalents of primary amine) were added 1,482 p of 1-methoxy-2-propanol and heated at 50°–90° C. until the amine number was 41–42.

IX. Testing of binders prepared according to the invention

1. The binders prepared in Examples VIII. 1, 2, 5, 6 and 8–26 were used to prepare clearcoats in accordance with the following formulation:

Formulation A: 286 p of the corresponding resin solution X g of 10% strength aqueous formic acid corresponding to Table 7, calculated on solid resin, 10 p of dibutyltin dilaurate baking conditions: 20 minutes at 160° C.

The formulations were in each case standardized with deionized water to a solids content of about 15%. The deposition time was in each case 2 minutes, and the voltages required for this purpose, the film thickness obtained and the properties obtained are listed in Tables 7 and 7a 2. The binders of Examples VIII.12., 14., 15., 17., 19., 20. and 26. were used to prepare pigmented coating materials in accordance with the following formulations.

| Pigment composition | |
|---|---|
| Formulation B: | 84 p of titanium dioxide (®Cronus RN59 from Cronus-Titangesellschaft, Leverkusen) |
| | 1 p of carbon black (Raven 1170 from Columbian Carbon, Hamburg) |
| | 10 p of aluminum silicate (®Lanco ASP 200 from Langer, Ritterhude) |
| | 5 p of lead silicate (EP 202 from Chemag Frankfurt/Main) |
| | 100 p |

The resins listed were standardized with methoxypropanol to a solids content of 60% and milled together with the abovementioned pigment mixture of schedule B on a three-roll mill down to a particle size of <5 μm. The products of Examples 12. to 17. were used to prepare two binder mixtures having different pigment levels (i.e. ratio of solid resin:pigment in parts by weight) in accordance with compositions C and D, which were in each case diluted with deionized water to a solids content of about 18%. Examples 19., 20. and 26. were only standardized to binder mixtures in accordance with composition D.

(C)
750 p of binder in accordance with Table 8
90 p of pigment mixture in accordance with schedule B
22.5 p of dibutyltin dilaurate
X p of 10% strength formic acid in accordance with Table 8

(D)
750 p of binder in accordance with Table 8
180 p of pigment mixture in accordance with schedule B
22.5 p of dibutyltin dilaurate
X p of 10% strength formic acid in accordance with Table 8
9 p of an anticratering additive (®Additol VXW 4922/280 from Hoechst AG)
9 p of flow control agent (Additional VXL 1359 from Hoechst AG)
18 p of 2,2,4-trimethyl-1,3-pentanediol monoisobutylrate 3. The binder of Example (VIII.27) was mixed with the fully blocked isocyanates (II.13) or (II.14) in a ratio of 70:30 and applied to Bonderite 132 panels in the presence of 1% lead in the form of lead octoate or 1% tin in the form of dibutyltin dilaurate. The paint films were baked at 130°, 140° and 150° C. and tested for their resistance to acetone. A paint film can be regarded as completely cured if the film is resistant to acetone for at least 1 minute.

| Binder/ Curing agent | Acetone test Baking temperature | | | | | |
|---|---|---|---|---|---|---|
| | 130° C. | | 140° C. | | 150° C. | |
| 70:30 | Lead | Tin | Lead | Tin | Lead | Tin |
| 27/1 | 15s | <15s | >1 min | 15s | >1 min | >1 min |
| 27/2 | >1 min | >1 min | >1 min | >1 min | >1 min | >1 min |

TABLE 7

| Resin VIII. used | 1 | 2 | 5 | 6 | 8 | 9 | 10 | 11 | 12 | 13 | 14 | 15 |
|---|---|---|---|---|---|---|---|---|---|---|---|---|
| Formic acid, 10% strength (p) | 46 | 46 | 46 | 60 | 32.2 | 27.6 | 32.2 | 27.6 | 27.6 | 23 | 27.6 | 27.6 |
| Bath pH | 6.0 | 6.0 | 7.3 | 6.8 | 6.2 | 6.4 | 6.1 | 6.5 | 5.0 | 5.8 | 6.1 | 6.3 |
| Maximum rupture voltage (V) | 300 | 400 | 250 | 300 | 400 | 450 | 400 | 450 | 500 | 500 | 500 | 500 |
| Deposition voltage (V)[1] | 200 | 300 | 150–200 | 200 | 300 | 300 | 300 | 300 | 400 | 400 | 400 | 400 |
| Film thickness (μm) | 10–15 | 12–14 | 10–15 | 10–12 | 15 | 12 | 15 | 14 | 15 | 12 | 16 | 21 |
| Flow[2] | 4–5 | 3–4 | 4–5 | 3–4 | 1–2 | 1 | 2 | 2 | 1 | 1–2 | 0–1 | 0–1 |
| Adhesion[2] | 4–5 | 2–3 | 4–5 | 2–3 | 0 | 0 | 0 | 0 | 0 | 0 | 0 | 0 |
| Crosslinking[3] | 40–80 | 80–100 | 20–60 | 80–100 | 80–10 | 80–100 | 100 | 100 | 100 | 100 | 100 | 100 |
| Impact test[4] | 60 | 60 | 20 | 60 | 140 | 160 | 160 | 160 | 160 | 140 | 160 | 140 |

| Resin VIII. used | 16 | 17 | 18 | 19 | 20 | 21 | 22 | 23 | 24 | 25 | 26 |
|---|---|---|---|---|---|---|---|---|---|---|---|
| Formic acid, 10% strength (p) | 23 | 27.6 | 27.6 | 27.6 | 19 | 23 | 19 | 23 | 19 | 32.2 | 46 |
| Bath pH | 6.6 | 6.4 | 6.6 | 6.0 | 6.5 | 6.7 | 6.8 | 5.5 | 6.7 | 4.5 | 5.5 |
| Maximum rupture voltage (V) | 500 | 350 | 300 | 400 | 350–400 | 200–250 | 200–250 | 300 | 300–350 | 200–250 | 400 |
| Deposition voltage (V)[1] | 400 | 250 | 200 | 300 | 300 | 200 | 200 | 250 | 250 | 200 | 200 |
| Film thickness (μm) | 10 | 12 | 20 | 30 | 25 | 17 | 18 | 20 | 20 | 25 | 20 |
| Flow[2] | 2 | 1–2 | 2 | 0 | 0 | 2 | 2 | 0 | 0 | 3 | 0 |
| Adhesion[2] | 0 | 0 | 0 | 0 | 0 | 2 | 3 | 0 | 0 | 2 | 0 |
| Crosslinking[3] | 60–80 | 60–80 | 80 | 100 | 100 | 100 | 100 | 100 | 100 | 100 | 100 |
| Impact test[4] | 140 | 120 | 120 | 160 | 160 | 140 | 100 | 140 | 160 | 140 | 160 |

[1]up to 28–30° C.
[2]0 best value 5 worst value
[3]MEK double rups, 1 kg add-on
[4]inch-pound

TABLE 8

| Resin used, VII | Pigmentation Level | | | | | | |
|---|---|---|---|---|---|---|---|
| | 1:0.2 | | | | 1:0.4 | | |
| Example | 12 | 14 | 15 | 17 | 19 | 20 | 26 |
| Formic acid, 10% strength (p) | 7.04 | 6.56 | 5.20 | 5.20 | 27.6 | 27.6 | 46 |
| Bath pH | 5.2 | 6.3 | 5.6 | 5.8 | 6.0 | 6.0 | 5.7 |
| Maximum rupture voltage (V) | >500 | 400 | >500 | >500 | 350–400 | 400 | 400 |
| Deposition voltage (V)[1] | 400 | 350 | 400 | 400 | 300 | 300 | 300 |
| Film thickness (μm) | 15 | 25 | 23 | 22 | 0 | 25 | 22 |
| Flow[2] | 0–1 | 1–2 | 0 | 0 | 0 | 0 | 0 |
| Adhesion[2] | 0–1 | 0–1 | 0 | 0 | 0 | 0 | 0 |
| Crosslinkling[3] | >100 | >100 | >100 | >100 | >100 | >60* | >100 |
| Impact test[4] | 4 | 10 | 40 | 40 | 80–120 | 10 | 80–120 |
| Erichsen's deep-drawing (mm) | 8.0 | 7.0 | 10 | 9.3 | 8–9 | 7.5–8.5 | 8–9 |

[1]–[4] see Table 7
*Value: >100 at 180° C., 20 min

We claim:

1. An aminourethane comprising structural units derived from (α) polyamines of the formula (I)

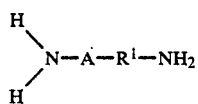
(I)

in which $R^1$ denotes a divalent hydrocarbon radical of 2 to 18 carbon atoms, and A is a chemical bond or —($R^1$—NH)$_r$—$R^1$—NH—, in which r is zero or a whole number from 1 to 6 and $R^1$ has the above meaning, structural units derived from (β) oligomeric or polymeric compounds which contain at least two (1) terminal 2-oxo-1,2-dioxolane groups, and structural units derived from compounds (acting as chain stoppers) (γ) of the group consisting of partially blocked polyisocyanates, monoepoxides and of amines of the formula (I')

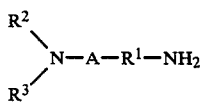
(I')

in which $R^1$ and A have the above meaning, and $R^2$ and $R^3$ denote alkyl of 1 to 8 carbon atoms or hydroxyalkyl of 1 to 8 carbon atoms in the alkyl radical, and $R^2$ and $R^3$ can also form a cyclic ring compound, or $R^2$ denotes hydrogen and $R^3$ is at least one of the radicals (a) to (d):

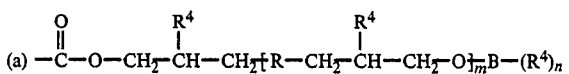

in which R is selected from the group consisting of a diglycidyl ether and diglycidyl ether optionally containing —$NR^2$ groups wherein $R^2$ is hydrogen or a divalent hydrocarbon, $R^4$ represents hydroxyl or the radical

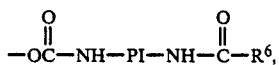

in which PI is the radical of a polyisocyanate, $R^6$ is the radical of an aliphatic, cycloaliphatic or alkylaromatic monohydric alcohol, of an aminoalcohol, of a ketoxime, of a CH— or NH—acidic compound, B denotes the radical of a polyol, m is a whole number from 1 to 3 and n is a whole number from 1 to 6, or

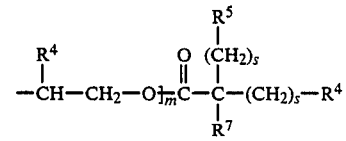

in which R, $R^4$ and m have the previously mentioned meaning, $R^5$ is hydrogen or $R^4$, $R^7$ denotes an alkyl radical of 1 to 8 carbon atoms and s represents a whole number from 1 to 6,

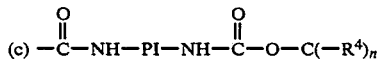

(d) the groups $R^8$—CHOH—$CH_2$—O—CO— or $R^8$—CHOH—$CH_2$— in which $R^8$ is hydrogen, alkyl of 1 to 18 carbon atoms or radicals of glyidyl esters or ethers or represents the group

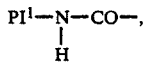

in which $PI^1$ is the radical of a partially blocked polyisocyanate.

2. A process for preparing an aminourethane as claimed in claim 1 which comprises reacting (α) a polyamine of the formula (I)

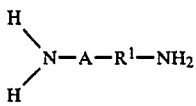
(I)

in which $R^1$ and A have the meaning as claimed in claim 1, with (β) an oligomeric or polymeric compound which contains at least two terminal 2-oxo-1,2-dioxolane groups, and (γ) a chain stopper of the group consisting of partially blocked isocyanates, monoepoxides and amines of the formula (I')

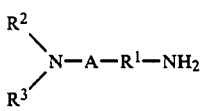
(I')

in which $R^1$ to $R^3$ and A have the meaning as claimed in claim 1.

3. The process as claimed in claim 2 wherein the oligomeric or polymeric compound ($\beta$) has the formula (III)

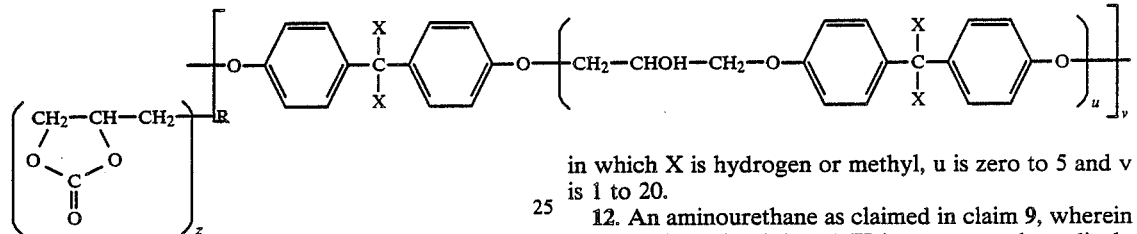

(III)

in which R has the meaning as claimed in claim 2 but corresponds in its valence to z, and z stands for 2 to 5.

4. A paint formulation containing as the binder, an aminourethane iof claim 1.

5. The paint formulation of claim 4 wherein the paint formulation is an aqueous formulation.

6. An electrocoating finish composition containing an aminourethane of claim 1.

7. The composition of claim 6 wherein the basic amino groups have been partially or completely neutralized.

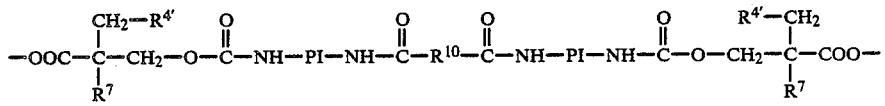

8. An aminourethane as claimed in claim 1, wherein the amount of ($\alpha$) is 35 to 85 mol-% and that of ($\beta$) is 65 to 15 mol-%.

9. An aminourethane as claimed in claim 1 which has the formula (II)

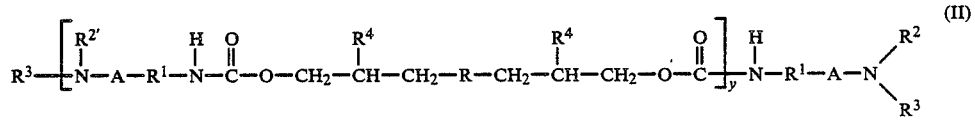

in which $R^1$ to $R^4$ and A have the above meaning, $R^{2'}$ is equal to $R^2$, with the proviso that $R^{2'}$ only represents hydrogen if the nitrogen atom in question is not at the end of a chain, y denotes a whole number from 1 to 10 and R can be identical or different and stands for the radical of a diglycidyl ether or ester which may also contain $(NR^2)$— groups, where $R^2$ has the above meaning, or for a divalent hydrocarbon radical of 2 to 18 carbon atoms.

10. An aminourethane as claimed in claim 1, which has the formula (IIa)

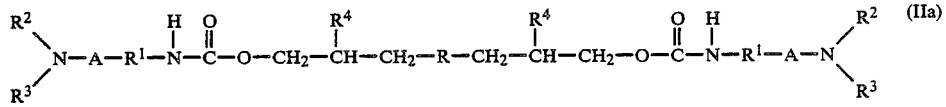

in which $R^1$ to $R^4$ and A have the above meaning.

11. An aminourethane as claimed in claim 9, wherein R in the formulae (II) and (IIa) is the radical

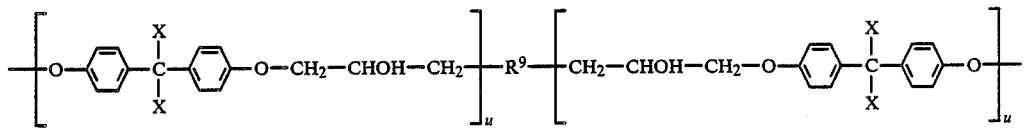

in which X is hydrogen or methyl, u is zero to 5 and v is 1 to 20.

12. An aminourethane as claimed in claim 9, wherein R in the formulae (II) and (IIa) represents the radical in which X and u have the meaning mentioned and $R^9$ is O-alkyl-O, N-alkyl-N having in each case 2 to 18 carbon atoms in the alkyl radical and the radical of polyamines, polyols, polycaprolactonepolyols, OH-containing polyesters, polyethers, hydroxyl-, carboxyl- and amino-functional polymers oils, polycarboxylic acids, hydroxyl- or amino-functional polytetrahydrofurans and reaction products of polyamines with glycidyl esters of Versatic acid.

13. An aminourethane as claimed in claim 12, wherein $R^9$ represents the radical where the radicals $R^7$ and PI have the above meaning, $R^{4'}$ is equal to $R^4$ and can additionally be hydrogen, $R^{10}$ stands for the radicals listed under $R^9$ with the exception of the polycarboxylic acids and the carboxyl-functional polymer oils or represents the radical

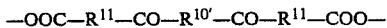

in which $R^{10'}$ has the definition of $R^{10}$ above and $R^{11}$ denotes the aliphatic, cycloaliphatic or aromatic radical of a polycarboxylic acid.

14. An aminourethane as claimed in claim 9, wherein R in the formulae (II) and (IIa) is the radical

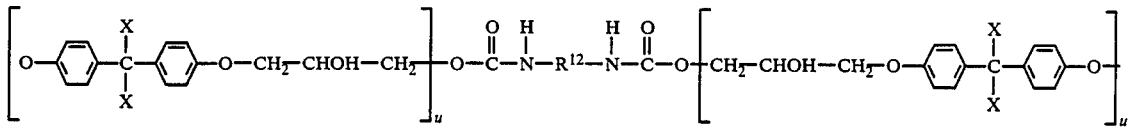

in which X and u have the meaning mentioned and $R^{12}$ is alkylene of 2 to 18 carbon atoms or the radical of a poly(sec.)amine or of an amino-functional polytetrahydrofuran.

15. An aminourethane as claimed in claim 9, wherein R in formula (II) or (IIa) is the radical

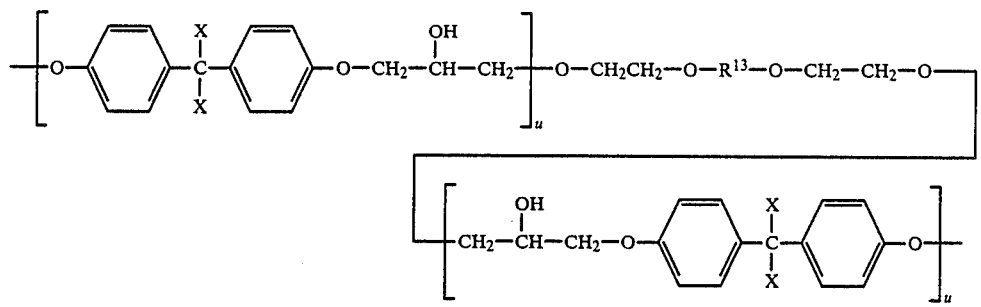

in which X and u have the meaning mentioned, but u is preferably 1, and $R^{13}$ represents the radical

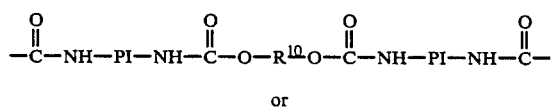

or

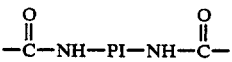

where $R^{10}$ and PI have the previously mentioned definitions.

16. An aminourethane as claimed in claim 1, wherein some or all of the hydroxyl or amino groups present have been reacted with partially blocked polyisocyanates.

17. The process as claimed in claim 2, wherein the amount of ($\alpha$) is 35 to 70 mol-% and that of ($\beta$) is 65 to 30 mol-%.

18. The process as claimed in claim 3, wherein z stands for 2.

19. The process as claimed in claim 3, wherein R is the radical of a polyether, of a polyetherpolyol, of a polyester, of a polyesterpolyol, of an alkylene radical, of a poly(sec.)amine radical, of a reaction product of an epoxy-carbonate compound with polyamines, polyols, polycaprolacetonepolyols, OH-containing polyesters, polyethers, polyglycols, hydroxyl-, carboxyl- and amino-functional polymer oils, polycarboxylic acids, hydroxyl- or amino-functional polytetrahydrofurans or of a reaction product of polyamines with polyglycidyl esters of Versatic acid.

20. The process as claimed in claim 2, wherein compound ($\beta$) has been prepared from epoxy carbonates of the formula (IV)

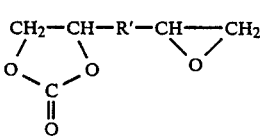

by conversion of multifunctional compounds which are addable onto the epoxy group, R' corresponding to the meaning of R and the conversions being carried out under conditions where only the epoxy groups react and the carbonate groups are not attacked.

21. The process as claimed in claim 2, wherein the reaction is carried out at 20° to 150° C.

22. The process as claimed in claim 2, wherein the aminourethane obtained, preferably dissolved in an inert water-miscible organic solvent, has added to it with partial or complete neutralization of the basic amino groups a water-soluble acid and if desired water in such a way that the product is obtained in water-dilutable and electrodepositable disperse form.

* * * * *

UNITED STATES PATENT AND TRADEMARK OFFICE
CERTIFICATE OF CORRECTION

PATENT NO. : 4,808,658
DATED : February 28, 1989
INVENTOR(S) : Gerd Walz et al

It is certified that error appears in the above-identified patent and that said Letters Patent is hereby corrected as shown below:

On the title page Item (75) Inventors:
"Gerhard Brincopke" should be
--Gerhard Brindopke--.

| Col. | Line | |
|---|---|---|
| 25 | 31&32 | "at least two (1) terminal 2-oxo-1,2-dioxolane groups" should be --at least two terminal 2-oxo-1,3-dioxolane groups-- |
| 26 | 35 | "(c) -C-NH-PI-NH-C-O-C$(-R^4)_n$" should be --(c)-C-NH-PI-NH-C-O-B$(R^4)_n$-- |
| 26 | 59 | "at least two terminal 2-oxo-1,2-dioxo-" should be --at least two terminal 2-oxo-1,3-dioxo-- |

Signed and Sealed this

Twenty-second Day of May, 1990

Attest:

HARRY F. MANBECK, JR.

*Attesting Officer*  *Commissioner of Patents and Trademarks*